June 28, 1932. J. A. ARENZ 1,865,226
SCREW MACHINE FOR CUTTING SINGLE POINT DOUBLE THREAD SCREWS
Filed Jan. 20, 1931 3 Sheets-Sheet 1

INVENTOR
JOHN A. ARENZ
BY HIS ATTORNEY

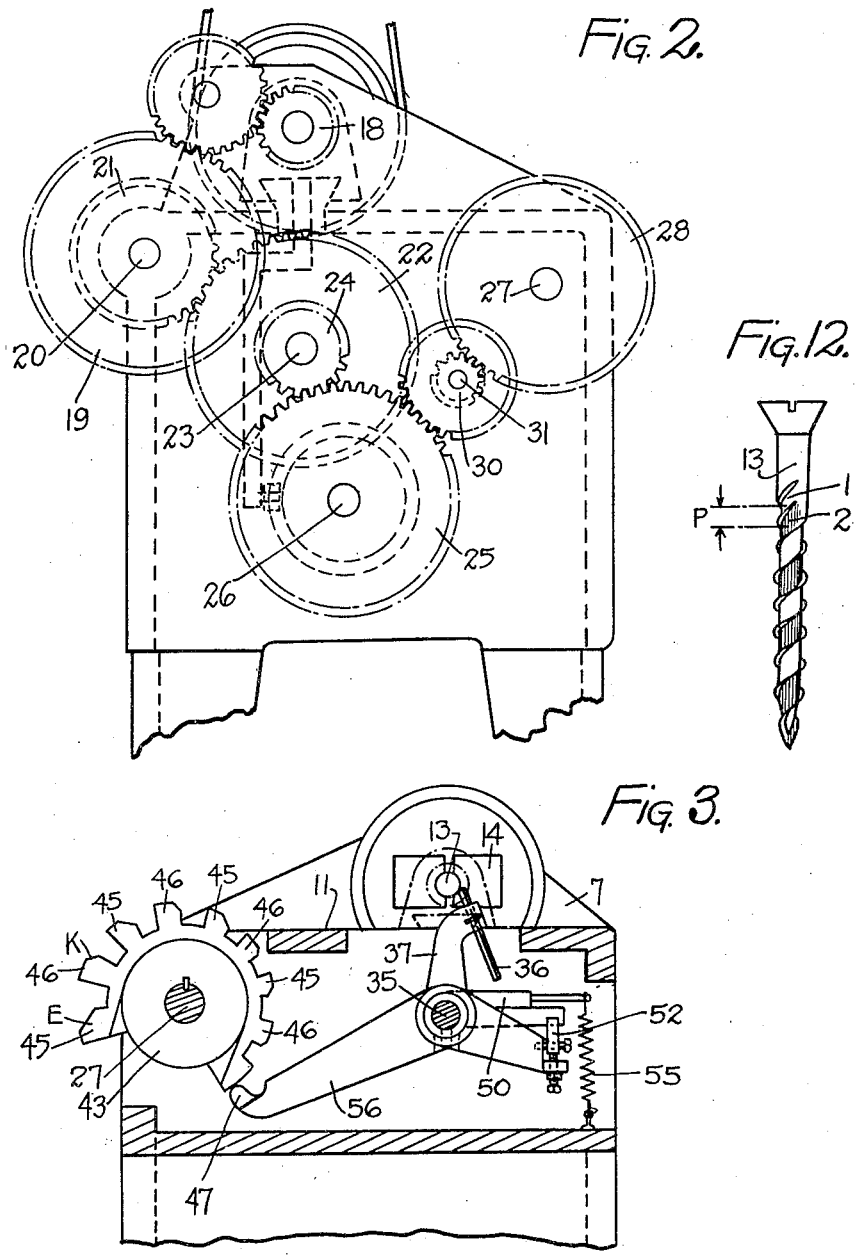

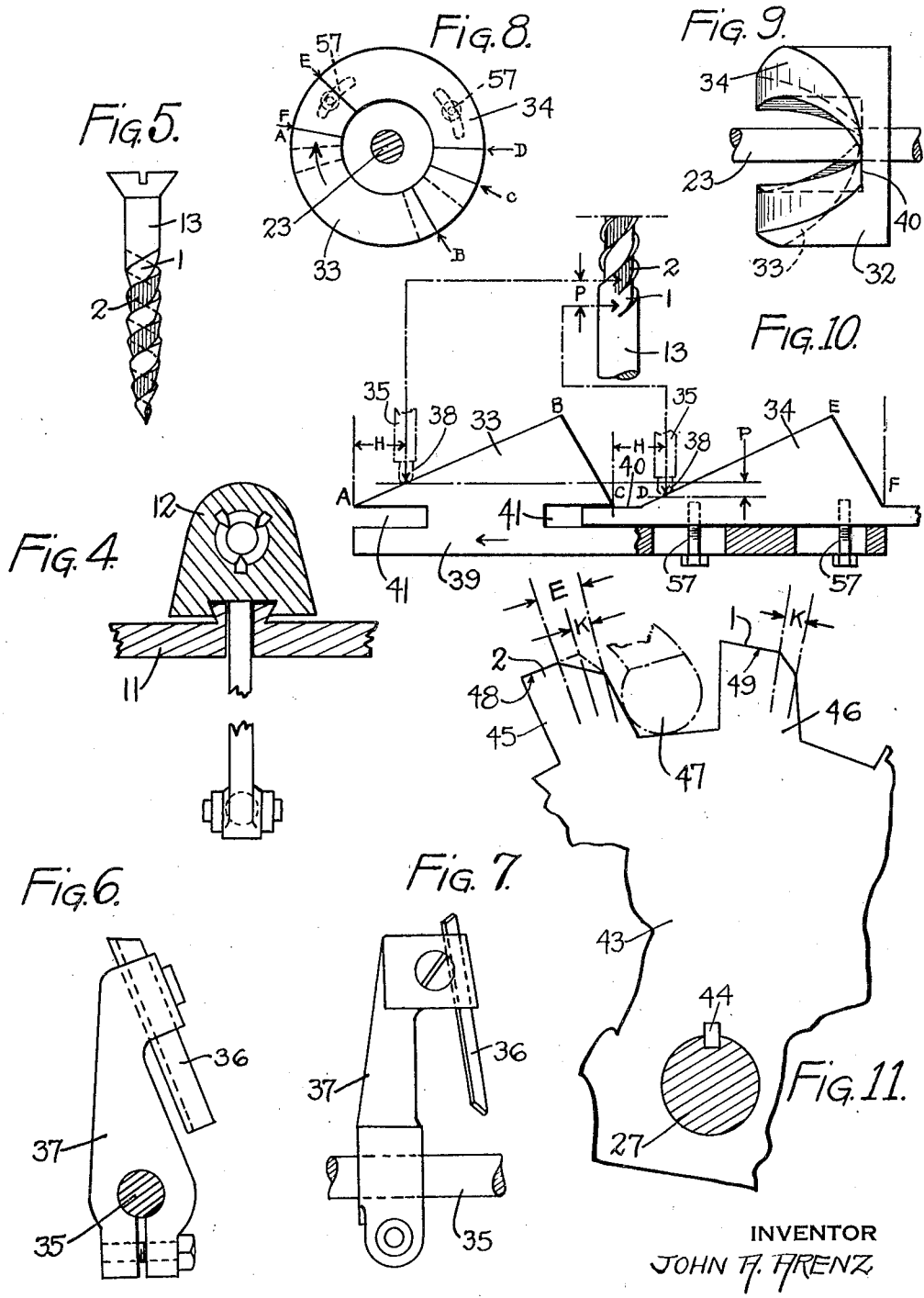

Patented June 28, 1932

1,865,226

UNITED STATES PATENT OFFICE

JOHN A. ARENZ, OF MOUNT VERNON, NEW YORK, ASSIGNOR TO INTERNATIONAL SCREW COMPANY, OF WILMINGTON, DELAWARE, A CORPORATION OF DELAWARE

SCREW MACHINE FOR CUTTING SINGLE POINT DOUBLE THREAD SCREWS

Application filed January 20, 1931. Serial No. 509,971.

This invention relates to screw cutting machines and in particular to a machine designed to cut on a screw blank, a double thread terminating in a single piercing point.

A particular object of my invention is to provide in a machine of the character referred to, means whereby a double thread may be efficiently and properly cut without the necessity of changing gears on the drive end of the machine to obtain a fraction of a revolution of the blank carrying spindle with respect to the number of revolutions made by the tool feed or pitch cam. In cutting a double thread, it is preferable, although not necessary, to commence the cutting of each individual thread at directly opposite sides of the screw blank and in order to do this with a reciprocating tool, it is necessary on alternate strokes of the tool to arrange for the positioning of the blank so that alternate strokes of the tool cutting every other thread, will commence to cut at opposite sides of the blank. A number of constructions have been employed to carry out this feature but they contemplate the use of a change gear on the drive end of the machine which it is desirable to eliminate in view of the expense attached to the replacement of gears and fine adjustments necessary and proper proportioning of the gear teeth.

As a further and equally important object of my invention I can cut a single point screw as covered by my Patent No. 1,651,796 and at the same time provide means for cutting the different threads to the proper depth and starting each thread, if desired, at opposite sides of the screw blank.

Changes and variations may be made in the construction shown and described without departing from the principles of the invention or sacrificing its chief advantages; hence such invention is not to be confined to the structures shown in the accompanying drawings:

Figure 2 is a view in elevation taken at the drive end of the machine illustrating the gear train necessary in driving the blank carrying spindle and pitch cam in direct ratio.

Figure 3 is a section taken on the line 3—3 of Figure 1 and illustrates the use of a new type depth cam which assists in the carrying out of my invention.

Figure 4 is a section taken on the line 4—4 of Figure 1 and shows the blank pointing means employed.

Figure 5 is a view in elevation of a single point, double thread screw in which the double threads begin at opposite sides of the blank, this type of screw being cut in my machine.

Figure 6 is a view in side elevation of a tool employed in the machine.

Figure 7 is a view in front elevation of the tools illustrated in Figure 6.

Figure 8 is an enlarged section taken on the line 8—8 of Figure 1, illustrating the relative locations of the rises or lobes and the dwell of the cam employed.

Figure 9 is an enlarged view in side elevation of the cam employed in my machine.

Figure 10 is a view showing the development of the cam illustrated in Figure 9.

Figure 11 is a fragmentary view of the depth cam showing the means employed in connection therewith for beginning the cutting of one thread in any spaced relation desired relative to the other thread, and Figure 12 is a view in elevation of the double thread single point screw which has been cut by the machine illustrated in Figure 1.

Figure 1:
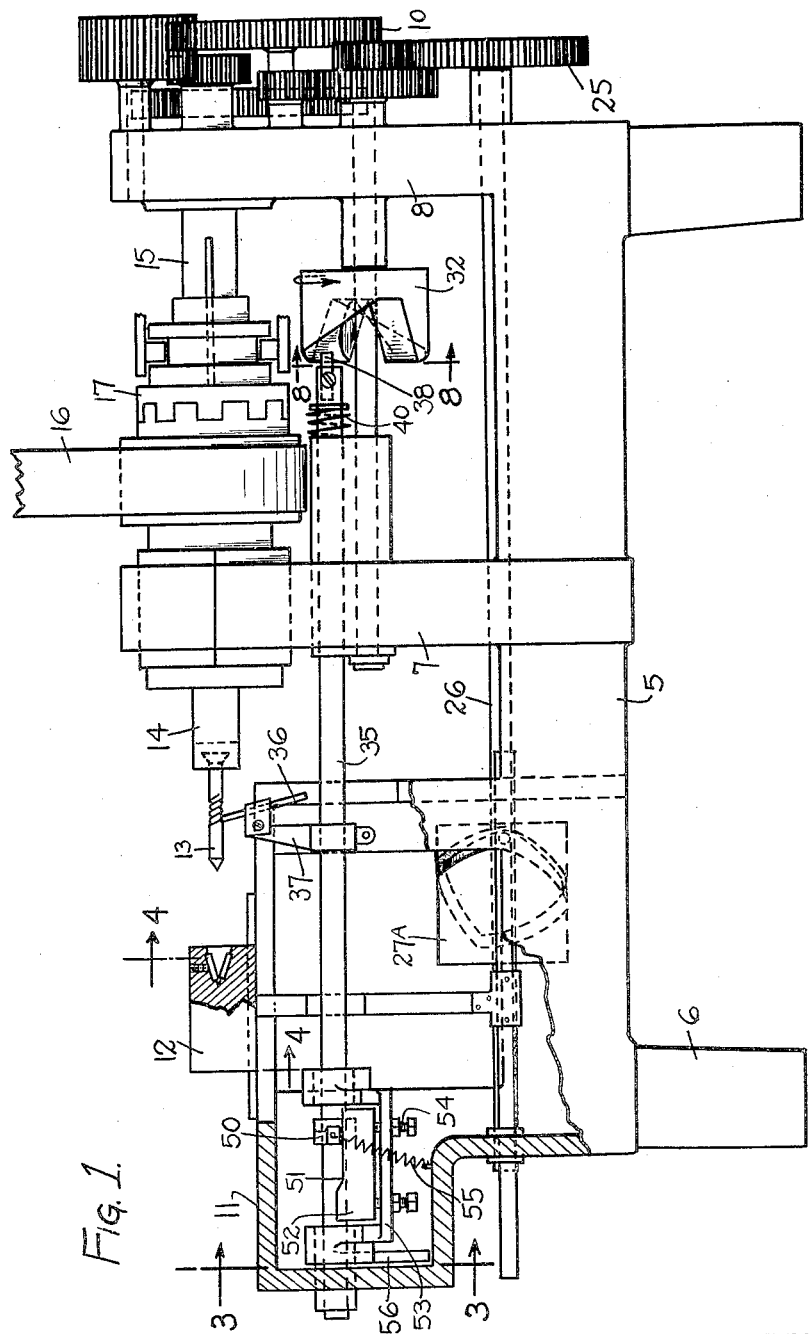
Figure 1 is a view in side elevation of a machine constructed in accordance with my invention, parts thereof being shown in section to illustrate the construction.

Referring to the drawings in detail, 5 indicates a machine frame embodying the legs 6 and uprights 7 and 8, the latter two providing journals for the various shafts and studs necessary to the support of the gear train 10 employed at the drive end of the machine.

One end of the machine is provided with a housing 11 upon which is mounted for sliding movement, a blank pointing tool 12 which reciprocates back and forth at proper timed intervals to point the screw blank 13 which is held in the chuck 14, revolved by the blank spindle 15. This blank spindle is driven by the belt 16 from any suitable source of power, the drive being controlled through the medium of a clutch 17 operated in any well known manner. The end of the blank spindle 15 beyond the upright 8 carries the drive pinion 18 which meshes with the intermediate gear 19 on the stud 20 to drive the gear 21 also secured to said stud. This gear 21 drives the gear 22 which operates the variable pitch or tool feed cam shaft 23. The shaft also carries the pinion 24 which meshes with and drives the pointer cam shaft gear 25 which operates the shaft 26 upon which is mounted the blank pointing cam 27$^A$.

The depth cam shaft 27 is not illustrated in Figure 1 but is shown in Figure 3 and this shaft 27, supported in a part of the machine frame is driven by the gear 28 secured thereto, the gear being driven by an intermediate pinion 29 which takes its power from the gears 25, a suitable pinion 30 being employed on the stud shaft 31 on which the gear 29 is mounted to transfer the drive from the gear 29 to the gear 28.

There are two new features in respect to my invention and in order to cut a double thread, each of the threads being designated as 1 and 2, see Figure 12, it is necessary to provide means whereby a single tool will cut these threads alternately to form the completed screw and will cut them accurately starting at the same point each alternate time. In order to carry out this feature of my invention, I have provided a special cam 32 as illustrated in Figures 1, 8 and 9 cut to provide two rising portions 33 and 34, the rising portions or lobes being arranged to move the tool shaft 35 longitudinally the same distance so that the tool 36 carried in the tool holder 37 secured to the shaft 35, will cut a double thread on the blank 13.

In order to understand the operation of my machine, it is noted that a blank 13 is positioned in the chuck 14 of the machine in any suitable automatic fashion and the pointer 12 operates to point the blank. The operation of the pointing cam 27$^A$ is in unison with the rest of the mechanism and properly timed and revolving movement of the cam 32 will reciprocate the tool 36 to form the threads. The shaft 35 has secured thereto, an extension 50, see Figure 1, which rests on a profile cam 51 having a high portion 52 which directs the tool inwardly along the pointed end of the blank to complete a threading operation. This cam 51 is adjustably mounted in a suitable holder 53 and adjustably secured therein through the medium of the bolts 54. A spring 55 is employed to maintain the extension 50 against the profile cam 51.

The cam holder 53 is provided with the cam arm 56, the end 47 of which engages the depth cam 43, the operation of the cam being such that the cam 52 is elevated for each succeeding cut of the tool with the result that the shaft 35 is revolved slightly to throw the tool 36 toward the blank 13, thereby providing for the depth of the thread. The bevel E on the upper edge of the teeth 45, or extensions of the depth cam 43, are of such a width that the cam follower 47 does not ride up on the surface 48 of the extensions 45 until the screw blank has revolved one-half turn so that the alternate cuts of the threading tool begin at opposite sides of the blank in cutting the double threads.

The cam rises or lobes 33 and 34 are equal in height so that the tool 36 is given a reciprocating movement of the same length at each stroke of the tool shaft 35. Between the lobe 33 and lobe 34, I provide a dwell 38. In order to make clear the operation of the tool in cutting a double thread and to show the purpose of the dwell 38 between the cam lobes which is a feature of my invention, reference is made to the cam construction illustrated in Figures 8 and 10, the latter figure being a cam development, and partly diagrammatic in its showing.

The cam 39 is substantially the same as cam 32 except that the lobe 34 is adjustable relatively to lobe 33 so that the amount of the dwell portion 40 is adjustable to suit various conditions and to this end the lobe 33 is undercut as at 41 so that the extensions 42 of the lobe 34 may fit therein and one or more dwells of the same or different lengths between the lobes may be employed. The lobe 34 is adjustably connected to the cam body 39 through the medium of a bolt and slot connection 57. Referring to Figure 10, the cam follower 38 in traversing A B would impart a thread cutting movement to the tool shaft 35. B C permits return of the tool shaft. C D permits a dwell of the tool shaft. D E imparts a second thread cutting movement to the tool shaft and E F permits return of the tool shaft, the cam follower 38 returning to its starting point A which in this instance coincides with point F. Both lobes are exactly the same height and consequently the stroke of the tool shaft 35 is always the same length.

The cam 39 rotating in the direction of the arrow will cause the follower 38 to be influenced by lobe 33 and when the cam travels distance H, the tool starts its cutting of the blank to form thread 2, the tool being directed against the work by the depth cam 43 heretofore referred to. Continued rotation of the cam returns the tool. The follower 35 is not influenced by the dwell 40 but is influenced by the rise or lobe 34 and after the cam has travelled the second distance H, the tool starts its second cutting of the blank to form the second or intermediate thread of a double thread screw.

However, this second distance H ends at a lower point on the lobe 34 than did the first distance H because the dwell 40 is included in the second distance H and consequently the follower is not advanced the same distance as it was at H on lobe 33. This "lost" distance is the pitch denoted in Figure 10 by P and as the tool starts cutting at H, the cut of thread 1 will be accomplished at the proper pitch distance, relatively to thread 2. It is evident that adjustment of lobe 34 will vary the pitch as desired. If an adjustable cam is not desired a one-piece cam can be employed as shown in Figures 1 and 9 having a fixed dwell 40 provided therein. The relation of rotation of the screw blank to the cam 39 may be illustrated as follows, this relation being obtained by the gearing on the drive end of the machine. While the cam 39 is revolving the distance A C, the screw blank 13 may, for instance, revolve eight and one-half times. The dwell 40 or distance C D would represent one revolution of the blank and while the cam is finishing a complete revolution by turning the distance D F, the blank revolves another eight and one-half revolutions, the spindle therefore turning 18 times to one complete revolution of the cam 32.

In order, however, to start one thread at the opposite side of the blank from the other, my invention contemplates an improvement in the depth cam tongues or extensions, as illustrated in Figure 11. Heretofore in the operation of a screw machine, the depth cam or tool feed cam which throws the tool toward the work, the teeth of the cam have all been the same shape but increasing in length in order to provide for the depth of cut on each succeeding feed motion of the tool. In my invention, the depth cam 43 which is mounted on the shaft 27 and keyed thereto as at 44, is provided with the radially extending teeth 45 or tongues, the alternate teeth being cut differently. In Figure 11, the tooth 46 is of the standard type in present day use, the bevel K indicating a means, the sole purpose of which, is to bring the tool point gradually against the work.

The tooth or extension 45 is provided with the bevel E which is considerably wider than the old bevel K and is of such a width that the follower 47 riding up over the edge of the bevel E will not attain the highest or peripheral surface 48 of the cam until the blank has turned a half revolution more than it turns when the follower 47 rides up on the surface 49 of the tooth 46. This occurs on alternate feeds of the cutting tool and permits the starting of the threads 1 and 2 at diametrically opposite sides of the blank 13, as indicated in Figure 5. This bevel E, as illustrated in Figure 11 is of such a width that it will start the cut at the opposite side of the blank but they can be started at any position relatively to each other on the circumference of the blank depending upon the width of the bevel E and this can be adjusted to suit the circumstances under which the thread is being cut.

It is evident, therefore, that I have provided an improved screw machine particularly adapted for turning out double threaded, single pointed screws of the type referred to which employs a pitch cam, one section of which may be adjustable to vary the pitch or the distance between centers of threads.

It is evident also that I have provided an improvement in the depth cam which contemplates bevelling so that the cut of the tool begins at the opposite sides of the screw blank.

My improved machine is so geared that the blank spindle and the pitch cam shaft revolves in direct ratio and has no fractional differences of rotation which has been heretofore employed in order to begin a cut at the diametrically opposite sides of a screw blank and which is objectionable in that lost motion in the gear teeth and wear cannot readily be taken up and results in the inaccurate spacing of the ends of the threads at the point where the cut is commenced on the periphery of the blank. Any wear in my cam 32 is even and makes no difference relatively in the starting point or spacing of the double threads.

My invention is not to be restricted to the precise details of construction shown since various changes and modifications may be made therein without departing from the scope of the invention or sacrificing the advantages derived from its use.

What I claim is:—

In a screw machine, a blank revolving spindle, a tool shaft arranged for rocking and longitudinal movement, a rotary pitch cam controlling the longitudinal movement of the shaft comprising a plurality of lobes of equal height and having spaces between the lobes of equal depth, means for adjusting one of the lobes peripherally of the cam and in respect to the other lobe to suit the pitch of the thread to be cut, a depth cam for controlling the rocking movement of the shaft having extensions thereon, one of the edges of the extensions being bevelled, and the edges of alternate extensions having a bevel of relatively greater width for controlling the starting point of a tool cut on the blank.

In testimony whereof I affix my signature.

JOHN A. ARENZ. [L. S.]